(12) United States Patent
Kawano et al.

(10) Patent No.: US 6,899,277 B2
(45) Date of Patent: May 31, 2005

(54) IC CARD AND ELECTRONIC DEVICES

(75) Inventors: Shinji Kawano, Hiroshima-Ken (JP); Futoshi Nakabe, Hiroshima-Ken (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 87 days.

(21) Appl. No.: 10/146,023

(22) Filed: May 16, 2002

(65) Prior Publication Data

US 2002/0170975 A1 Nov. 21, 2002

(30) Foreign Application Priority Data

May 17, 2001 (JP) .......................................... 2001-147507

(51) Int. Cl.$^7$ .............................................. G06K 19/06
(52) U.S. Cl. ....................... 235/492; 235/487; 235/375; 235/380; 235/379; 235/384
(58) Field of Search ................... 235/492, 487, 235/375, 380, 383, 379, 384

(56) References Cited

U.S. PATENT DOCUMENTS

| | | | | | |
|---|---|---|---|---|---|
| 5,206,495 | A | * | 4/1993 | Kreft | 235/492 |
| 5,875,450 | A | | 2/1999 | Reiner et al. | |
| 5,999,713 | A | | 12/1999 | Reiner et al. | |
| 6,045,043 | A | * | 4/2000 | Bashan et al. | 235/441 |
| 6,105,874 | A | * | 8/2000 | Berger et al. | 235/492 |
| 6,138,918 | A | * | 10/2000 | Tarbouriech | 235/492 |
| 6,161,762 | A | * | 12/2000 | Bashan et al. | 235/492 |
| 6,168,083 | B1 | * | 1/2001 | Berger et al. | 235/492 |
| 6,199,763 | B1 | * | 3/2001 | Thuringer et al. | 235/492 |
| 6,375,082 | B1 | * | 4/2002 | Kobayashi et al. | 235/492 |

FOREIGN PATENT DOCUMENTS

| | | |
|---|---|---|
| DE | 198 16 417 A1 | 10/1999 |
| EP | 0 945 828 A2 | 9/1999 |
| JP | 02-045893 | 2/1990 |
| JP | 02-109188 | 4/1990 |
| JP | 6-243306 | 9/1994 |
| JP | 10-124626 | 1/1998 |
| JP | 11-272824 | 10/1999 |
| JP | 2000-40129 | 2/2000 |
| JP | 2000-322544 | 11/2000 |

* cited by examiner

*Primary Examiner*—Steven S. Paik
(74) *Attorney, Agent, or Firm*—McDermott Will & Emery LLP

(57) ABSTRACT

An IC card provided with a contact-type interface and a non-contact-type interface as the communication interface, and other electronic devices. The IC card identifies the kind of communication data communicated with an external device such as reader-writer, and decides on a communication interface that follows the identified communication data. Then, it is judged whether to switch the communication interface used communication for with the external device between the contact-type interface and the non-contact-type interface. And if it is decided to switch, the communication interface used for communication with the external device is switched.

10 Claims, 16 Drawing Sheets

FIG. 2

| CARD COMMUNICATION CONDITIONS INFORMATION |
|---|
| NUMBER-OF-PIECES INFORMATION ON APPLICATION-WISE COMMUNICATION CONDITIONS INFORMATION |
| APPLICATION-WISE COMMUNICATION CONDITIONS INFORMATION A1 |
| APPLICATION-WISE COMMUNICATION CONDITIONS INFORMATION A2 |
| APPLICATION-WISE COMMUNICATION CONDITIONS INFORMATION A3 |
| .. |
| APPLICATION-WISE COMMUNICATION CONDITIONS INFORMATION An |

FIG. 3

| |
|---|
| APPLICATION IDENTIFIER |
| TOTAL COMMUNICATION CONDITIONS |
| NUMBER-OF-PIECES INFORMATION ON COMMUNICATION DATA-WISE COMMUNICATION CONDITIONS INFORMATION |
| COMMUNICATION DATA-WISE COMMUNICATION CONDITIONS INFORMATION $c_1$ |
| COMMUNICATION DATA-WISE COMMUNICATION CONDITIONS INFORMATION $c_2$ |
| COMMUNICATION DATA-WISE COMMUNICATION CONDITIONS INFORMATION $c_3$ |
| ⋮ |
| COMMUNICATION DATA-WISE COMMUNICATION CONDITIONS INFORMATION $c_n$ |

FIG. 5A

| PERMIT CONDITIONS | RECOMMENDATION CONDITIONS |
|---|---|

FIG. 5B

| | B1 | B2 |
|---|---|---|

FIG. 6

| TOTAL COMMUNICATION CONDITIONS |
|---|
| NUMBER-OF-PIECES INFORMATION ON COMMUNICATION DATA-WISE COMMUNICATION CONDITIONS INFORMATION |
| COMMUNICATION DATA-WISE COMMUNICATION CONDITIONS INFORMATION C1 |
| COMMUNICATION DATA-WISE COMMUNICATION CONDITIONS INFORMATION C2 |
| COMMUNICATION DATA-WISE COMMUNICATION CONDITIONS INFORMATION C3 |
| ... |
| COMMUNICATION DATA-WISE COMMUNICATION CONDITIONS INFORMATION Cn |

FIG. 11

| PERMIT CONDITIONS | 1 | 0 |
|---|---|---|
| RECOMMENDATION CONDITIONS | 1 | 0 |

FIG. 13

| Command name | Command receiving | Command sending |
|---|---|---|
| SELECT FILE | ○ | ○ |
| VERIFY | × | ○ |
| GET CHALLENGE | ○ | × |
| EXTERNAL AUTHENTICATE | × | ○ |
| INTERNAL AUTHENTICATE | ○ | × |
| READ RECORD(S) | ○ | × |
| APPEND RECORD | × | ○ |
| UPDATE RECORD | × | ○ |
| ERASE ALL RECORDS | ○ | ○ |
| GET DATA | ○ | × |
| PUT DATA | × | ○ |
| CHANGE REFERENCE DATA | × | ○ |
| DEACTIVATE FILE | ○ | ○ |
| ACTIVATE FILE | ○ | ○ |
| RESET RETRY COUNTER | ○ | ○ |
| MANAGE SECURITY ENVIRONMENT | × | ○ |
| COMPUTE DIGITAL SIGNATURE | ○ | × |
| VERIFY DIGITAL SIGNATURE | × | ○ |
| VERIFY CERTIFICATE | × | ○ |
| GENERATE PUBLIC KEY PAIR | ○ | × |
| CREATE FILE | ○ | ○ |
| EXPAND FILE | ○ | ○ |
| REMOVE FILE | ○ | ○ |
| MANAGE ATTRIBUTE | × | ○ |

IC CARD AND ELECTRONIC DEVICES

BACKGROUND OF THE INVENTION

1. Field of the Invention

The present invention relates to an IC card and other electronic devices having a contact-type interface and a non-contact-type interface as a communication interface for communication with external devices such as card reader-writer.

2. Description of the Related Art

The magnetic card has found a variety of uses such as the credit card, the cash card and the commutation ticket. The IC (integrated circuit) card is superior to the magnetic card with regard to memory capacity for information, safety of information, or the like. But in Japan, the IC card has not been used widely yet. One of the reasons for that is its high cost as compared with the magnetic card. A multi-purpose IC card is expected to spread as the card that overcomes the cost problem. One IC card can be used for a plurality of purposes such as the credit card, the cash card, the electronic money and the ID card. That can reduce the cost per purpose.

In case the IC card is for a plurality of uses, applications for the respective uses are stored in non-volatile memory such as EEPROM (Electrically Erasable Programmable Read Only Memory) mounted on an IC chip loaded on the IC card.

The respective applications work on CPU (Central Processing Unit) mounted on the IC chip and communicate with external devices such as a card reader-writer utilizing the communication interface on the IC card and sends and receives data, holds individual authentication, or the like.

Communication interfaces mounted on the IC card can be broadly classified into the contact-type interface and the non-contact-type interface.

The contact-type interface brings a contact point on the card into contact with the external device and communicates through its contact point. On the other hand, the non-contact-type interface gets into wireless communication with the external device through an antenna provided on the card. Either of the interfaces is used not only for communication but also for receiving power from the external device.

Many of the IC cards for a plurality of uses are usually the so-called combination cards on which both the contact-type interface and the non-contact-type interface are mounted.

That is because which of the communication interfaces is suitable depends on use in many cases. For example, if the IC card mounted with the contact-type interface is used as commutation ticket, the contact point frequently comes into contact with the external device. And there is fear that the contact point will wear out until communication is impossible. For the commutation ticket, therefore, the IC card mounted with the non-contact-type interface is preferable. For uses such as a cash card, on the other hand, the IC card mounted with a contact-type interface is preferable because the frequency of communication with external device is low as compared with the commutation ticket and is effective in preventing tapping.

Therefore, there is a great necessity that the IC card for a plurality of uses should be mounted with the both types of the interface.

In case a combination card is used as an IC card for a plurality of uses, communication interfaces used by applications are preset for the respective applications to match with communication interfaces utilized for the respective uses.

For example, the application that makes the IC card function as the commutation ticket uses the non-contact-type interface as the communication interface while the application that makes the IC card function as the cash card uses the contact-type interface as the communication interface.

As set forth above, which of the communication interfaces is suitable can depend on use. Therefore, the communication interface utilized by application is preset to the contact-type interface or non-contact-type interface. But either of the interfaces has both advantages and disadvantages.

The non-contact-type interface is relatively high in communication speed and also is highly easy of maintenance. Another advantage is that one external device can communicate with a plurality of IC cards simultaneously. On the other hand, the non-contact-type interface has a shortcoming. That is, the communication is wireless and there is fear of security such as tapping. Meanwhile, the contact-type interface has such shortcomings as relatively low communication speed and less easy maintenance, but has an advantage with regard to security.

Therefore, even if the communication interface to be used by application is preset to either of the interfaces according to use, the advantages the respective interfaces have can not be made full use of.

For example, of the non-contact-type interfaces, the proximity-type interface is not much more than 106 kbps in communication speed, while the contact-type interface is not much more than 9.6 kbps in communication speed. In case an IC card is used as the cash card, priority is given to prevention of tapping or the like and the contact-type interface is used. Yet, it is not desirable to sacrifice the communication speed.

Such a problem comes up with not only the IC card but also other electronic devices that have a contact-type interface and a non-contact-type interface as the communication interface for communication with external devices.

SUMMARY OF THE INVENTION

The present invention has been made in view of such problems with the related art technique, and it is an object of the present invention to provide an IC card and electronic devices that can make good use of advantages of the respective communication interfaces.

To achieve the above objects, the present invention has adopted the following means. These means will be described with IC card 100 as shown in FIG. 1, for example.

As shown in FIG. 1, this IC card 100 is provided with a contact-type interface 106a and a non-contact-type interface 106b as a communication interface 106 for communication with an external device 200.

The communication interface 106 used for communication with external device 200 can be switched between the contact-type interface 106a and the non-contact-type interface 106b by a changeover switch 105.

The switching of the communication interface 106 by changeover switch 105 is controlled by CPU 104.

@¼

When controlling the switching of the communication interface 106 by the changeover switch 105, the CPU 104 first decides on a communication interface that follows communication conditions concerning communication with the external device 200. The communication conditions concerning communication with the external device 200 include conditions concerning the kind of communication data communicated with the external device 200, for example, and are stored in an EEPROM 101. Let it be supposed that communication data that the IC card 100 sends in response in accordance with a command from the external device 200 is a code number of a cash card. If this communication data leaks out, there is a possibility of causing the owner of the IC card 100 a great loss. For this reason, data such as the code number is often encrypted. If communication data is data to be classified, it is better for communication conditions to designate the contact-type interface 106a that is considered to be safer than the non-contact-type interface 106b. Data to be classified are data including at least any one of an encryption key data, a signature, random numbers, a certificate and encrypted data. Of the commands communicated between the external device 200 and the IC card 100, some involve important data in the light of security and others do not. Therefore, the conditions concerning the communication data may designate a communication interface used for communication with the external device for every command communicated with the external device.

Judging that communication data to be sent in response is a code number, for example, the CPU 104 decides on the contact-type interface 106a of the communication interface 106 in accordance with the conditions concerning the communication data.

Thus deciding on the communication interface 106 that follows the communication conditions, then the CPU 104 judges on the basis of the decision whether to switch the communication interface 106 to be used for communication with the external device 200 between the contact-type interface 106a and the non-contact-type interface 106b. This judgement is made depending on whether a communication interface 106 that was to be used or being used before the judgement is identical with the communication interface 106 which the CPU 104 decides on. In case the communication interface 106 before judgement is identical with the communication interface 106 which the CPU 104 decides on, the CPU 104 decides not to switch the communication interface 106 used for communication with the external device 200. On the other hand, in case the communication interface 106 before judgement is not identical with the communication interface 106 which the CPU 104 decides on, the CPU 104 judges whether to switch the communication interface 106 used for communication with the external device 200.

And judging that the communication interface 106 used for communication with external device 200 should be switched, the CPU 104 sends out a changeover request to a changeover switch 105. Receiving the changeover request from the CPU 104, the changeover switch 105 switches the communication interface 106 from the non-contact-type interface 106b to the contact-type interface 106a, for example. Then, the CPU 104 holds communication with the external device 200 utilizing the contact-type interface 106a.

Therefore, even if communication is to be held with the external device 200 utilizing the non-contact-type interface 106b, the communication interface 106 will be automatically switched to the contact-type interface 106a that is higher in security when it is necessary to send to the external device 200 a code number that is important in the light of security.

Furthermore, when it is necessary to send to the external device 200 communication data that is large in volume though low in security importance, the contact-type interface 106a that is high in communication speed can be utilized automatically.

As described, advantages of the respective communication interfaces can be made good use of in the IC card 100.

As a result, it is possible to improve the convenience of the user of the IC card 100 and the quality of service offered to the user by the IC card 100.

The communication conditions may include permit conditions stipulating permission and prohibition of use of the communication interface and recommendation conditions that can be used unless they do not contradict the permit conditions.

In this case, the CPU 104 judges whether the permit conditions and the recommendation conditions agree with each other. And if it is judged that those conditions agree with each other, the CPU 104 decides on the communication interface using the recommendation conditions. In case it is judged that the conditions do not agree with each other, the CPU 104 decides on the communication interface using the permit conditions. In case a plurality of applications work on the IC card 100, communication conditions may be decided on for every application, because data to be communicated are often different in nature depending on the application. If communication conditions are decided on for every application, a communication interface that matches with the working application of a plurality of applications can be selected out.

Furthermore, in case there are other communication conditions than the conditions concerning communication data communicated with the external device 200, the CPU 104 may decide on the non-contact-type interface as a communication interface 106 used for communication with the external device 200 in accordance with the communication conditions other than the conditions on communication data.

Then, in case the permit conditions of the conditions concerning communication data prohibit use of the non-contact-type interface, the CPU 104 stops communication using the non-contact-type interface of the communication data for which use of non-contact-type interface is prohibited.

Because of this, even if the external device 200 has a non-contact-type interface only, for example, and the communication interface to be used by the IC card 100 is limited to the non-contact-type interface, it is possible to avoid communicating highly confidential communication data using the non-contact-type interface in which tapping is feared.

In this case, if the external device 200 is equipped with a contact-type interface, too, highly confidential communication data may be communicated using the contact-type interface in accordance with the conditions concerning communication data.

The CPU 104 can change the communication interface to decide on according to a given time-series pattern. This is affected when communication conditions for mutual authentication of the IC card 100 and the external device 200 are set and when the communication partner is merely confirmed. Even if the communication interface is switched with a given time-series pattern and yet the IC card 100 and the external device 200 can communicate with each other precisely, there must be a valid or proper communication partner. Thus, it is possible to authenticate that the IC card 100 and the external device 200 are valid or to confirm that the communication partner is proper.

Also, the CPU 104 may decide on different communication interfaces for data to be sent to the external device 200 and data to be received from the external device 200. In this case, the changeover switch is provided on each side—the side from which data is sent to the external device and the side where data is received from the external device. In case one switch switches the communication interface to one of the contact-type interface and the non-contact-type interface, the other switch switches the communication interface to the other of the interfaces. In case the changeover switch on the side where data is sent to the external device 200 switches the communication interface to the contact-type interface, the changeover switch on the side where data is received from the external device 200 switches the communication interface to the non-contact-type interface. Meanwhile, in case the changeover switch on the side where data is sent to external device 200 switches the communication interface to the non-contact-type interface, the changeover switch on the side where data is received from the external device switches the communication interface to the contact-type interface. That makes it possible to hold full duplex communication in a pseudo manner utilizing the contact-type interface and the non-contact-type interface. In addition, even if full duplex communication is held in a pseudo manner utilizing the contact-type interface and the non-contact-type interface, the advantages of the respective interfaces can be made good use of by switching the communication interface.

The processing by the CPU 104 as mentioned above is accomplished by a program. That may be affected by special hardware, too.

Furthermore, the present invention can be applied to other electronic equipment provided with a contact-type interface and non-contact-type interface as the communication interface for communication with the external device instead of IC card.

BRIEF DESCRIPTION OF THE DRAWINGS

FIG. 2 is a diagram showing a structural example of a communication conditions table.

FIG. 3 is a structural example of application-wise communication conditions information.

FIG. 5A is a structural example of designating conditions and FIG. 5B is a diagram showing permit conditions or recommendation conditions.

FIG. 6 is a diagram of a structural example of card communication conditions information.

FIG. 11 is a diagram showing a concrete example of designating conditions to designate the contact-type interface.

FIG. 13 is a diagram showing a concrete example of the relation between a command set and conditions concerning communication data.

DESCRIPTION OF THE PREFERRED EMBODIMENTS

Now, the embodiments of the present invention will be described with reference to the drawings.

Embodiment 1

In this Embodiment, the present invention appears in an IC card that functions as a plurality of different cards such as a cash card and commutation ticket.

Figure 1:
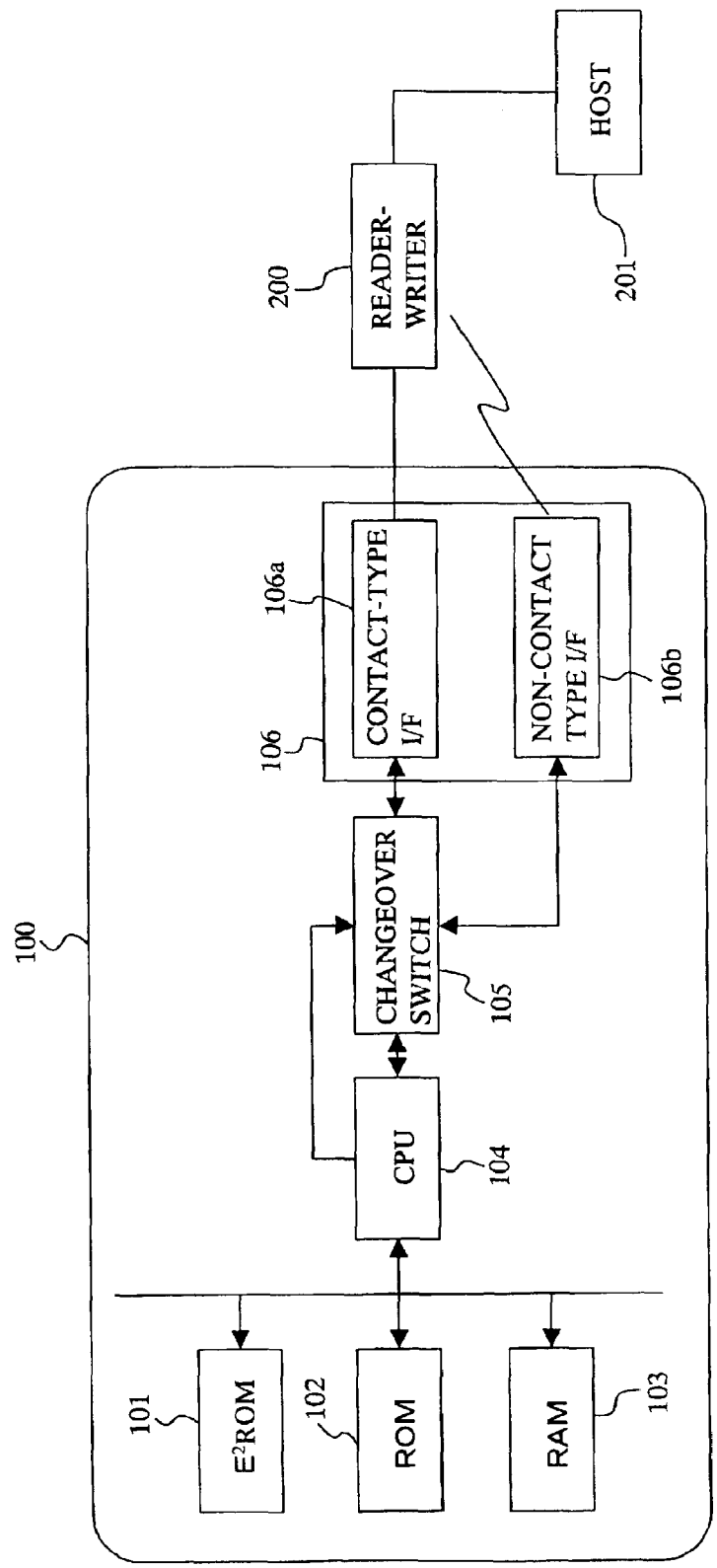
FIG. 1 is a diagram showing an arrangement example of an IC card to which the present invention is applied.

As shown in FIG. 1, this IC card 100 has an EEPROM 101, a ROM 102, and a RAM 103 as storages.

The respective applications that make the IC card 100 function as the cash card, commutation ticket, or the like, are stored in the EEPROM 101. In the ROM 102, OS (operating system) is stored. The RAM 103 provides a working area for OS and the respective applications.

The CPU 104 that makes programs such as OS and the respective applications is connected with a communication interface 106 through a changeover switch 105 to communicate with an external device 200 such as the card reader-writer.

The external device 200 is provided with a contact-type interface and a non-contact-type interface as the communication interface for communication with the IC card 100. Furthermore, the external device 200 is connected with a host 201 through another communication interface.

The CPU 104 starts up the application in accordance with an instruction that is received from the external device 200 through the communication interface 106. Following the started up the application, the CPU 104 records data from the external device 200 on the EEPROM 101 or the RAM 103 and sends data stored in the EEPROM 101 to the external device 200 using the communication interface 106. The application itself is downloaded to the EEPROM 101 of the IC card 100 from the external device 200 through the communication interface 106 when the application starts to be used as a card for a given purposes or is renewed, for example.

The communication interface 106 of the IC card 100 includes the contact-type interface 106a and the non-contact-type interface 106b.

The communication interface 106 used by the application can be switched at any time between the contact-type interface 106a and the non-contact-type interface 106b by the changeover switch 105 that the CPU 104 controls.

A control program to make the CPU 104 control the changeover switch 105 and tables that the control programs use are stored in the EEPROM 101, for example. The table utilized by the control program is a communication conditions table in which communication conditions concerning communication with the external device 200 are described. Now, an example of the structure of the communication conditions table is shown in FIG. 2.

As shown in FIG. 2, for example, the communication conditions table comprises card communication conditions information, number-of-pieces information on application-wise communication conditions information, a plurality of pieces of applications-wise communication conditions information.

The application-wise communication conditions information is information to show communication conditions stipulated for every application, and has a structure as shown in FIG. 3. That is, the application-wise communication conditions information includes application identifiers, total communication conditions, number-of-pieces information on communication data-wise communication conditions information, and communication data-wise conditions.

The application identifier is an identifier for the control program to identify an application. The control program specifies the application-wise communication conditions information on the working application by the application identifier. The communication data-wise communication conditions information is information to show communication conditions for every communication data that the CPU 104 communicates with the external device 200 in accordance with the application.

Figure 4:
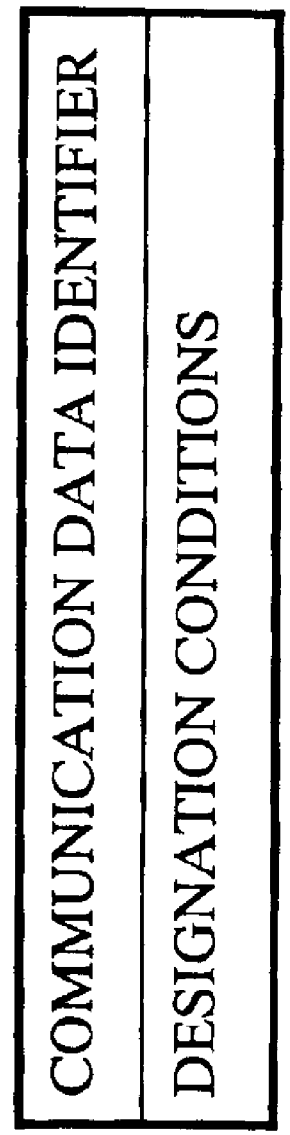
FIG. 4 is a structural example of communication data-wise conditions information.

As shown in FIG. 4, the communication data-wise communication conditions information includes communication data identifiers and designating conditions. The communication data identifier is an identifier for the control program to identify communication data. The control program specifies communication data-wise communication conditions information on communication data communicated between the IC card 100 and the external device 200 by the communication data identifier. The designating conditions designate the communication interface 106 used for communication with the external device 200, and have a structure as shown in FIG. 5A.

The designating conditions include permit conditions and recommendation conditions. The permit conditions are conditions to stipulating permission and prohibition of use of the communication interface 106 by the application. The recommendation conditions are conditions that can be used unless they contradict the permit conditions.

The permit conditions and recommendation conditions include a bit B1 for the contact-type interface 106*a* and a bit B2 for the non-contact-type interface 106*b* as shown in FIG. 5B. The permit conditions permit use of the communication interface 106 if bits B1 and B2 are 1, and prohibits use of the communication interface 106 if bits B1 and B2 are 0, for example. The recommendation conditions recommend use of the communication interface 106 if bits B1 and B2 are 1 and do not recommend use of the communication interface 106 if bits B1 and B2 are 0, for example. These values of the bits B1 and B2 may be given as null. In that case, it indicates that recommendation conditions are not given.

The total communication conditions in the application-wise communication conditions information are conditions used for communication data of which communication data-wise information is not included in the application-wise communication conditions information and include the designating conditions having the same structure as the one included in the communication data-wise communication conditions information (does not include the communication data identifier).

Furthermore, number-of-pieces information on the communication data-wise communication conditions information on the application-wise communication conditions information includes the number of pieces of the communication data-wise communication conditions information included in the application-wise communication conditions information. The lengths of the respective communication data-wise communication conditions information are the same. According to the control program, the CPU 104 refers to the number of pieces to specify borders of the respective communication data-wise communication conditions information.

To show the number of pieces of such application-wise communication conditions information is the number-of-pieces information on application-wise communication conditions information of the communication conditions table. Card communication conditions information of the communication conditions table is information to show communication conditions prescribed as default about the IC card 100 and is used mainly for applications of which application-wise communication conditions information is not included in the communication conditions table. The card communication conditions information may be utilized in combination with the application-wise communication conditions information.

The card communication conditions information includes total communication conditions, number-of-pieces information on communication data-wise communication conditions information, a plurality of pieces of communication data-wise communication conditions information as shown in FIG. 6. The difference in structure between the card communication conditions information and the application-wise communication conditions information is that the former does not include an application identifier. The total communication conditions, number-of-pieces information on communication data-wise communication conditions, communication data-wise communication conditions information on the card communication conditions information are identical with those of the application-wise communication conditions information in structure.

The card communication conditions information is downloaded on the EEPROM 101 when the IC card 100 begins to be used by a specific individual, and the card communication conditions information is also stored fixedly on the EEPROM 101 when the IC card 100 is prepared.

Meanwhile, application-wise communication conditions information is stored in EEPROM 101 when an application is downloaded on the IC card 100 or executed.

In case the card communication conditions information is used in combination with the application-wise communication conditions information, the CPU 104, when the application is started, generates a communication conditions table with the application working (communication conditions table in operation) from the communication conditions table as mentioned above in accordance with the control program and refers to the generated communication conditions table in operation and decides on the communication interface 106 to be switched until the application ends.

Figure 7:
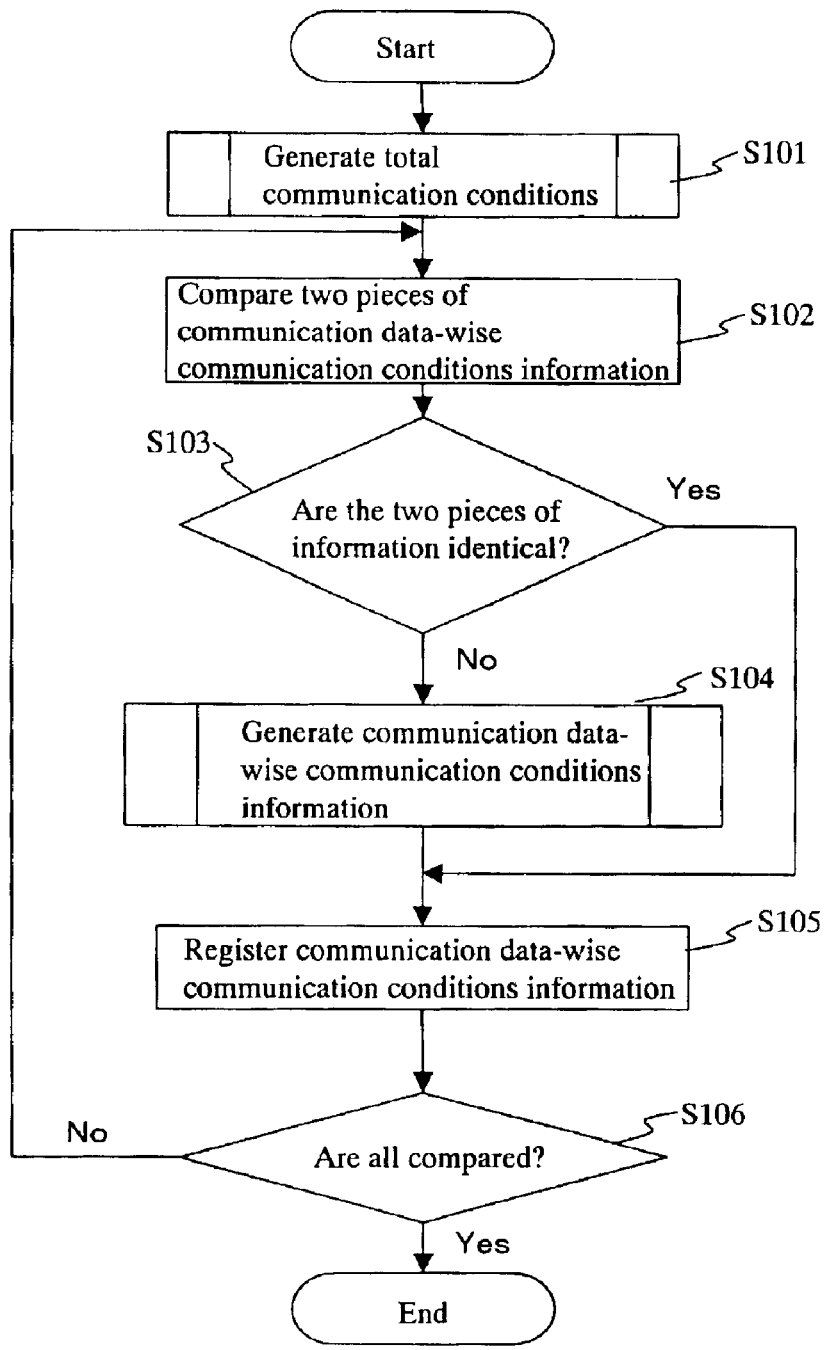
FIG. 7 is a flow chart showing a procedure for generating a communication conditions table in operation.

FIG. 7 is a flow chart showing a procedure for generating a communication conditions table in operation. As shown in FIG. 7, according to the control program, the CPU 104 first generates total communication conditions of the communication conditions table in operation from the total communication conditions included in the card communication conditions information and the application-wise communication conditions information on the communication conditions table (S 101).

Figure 8:
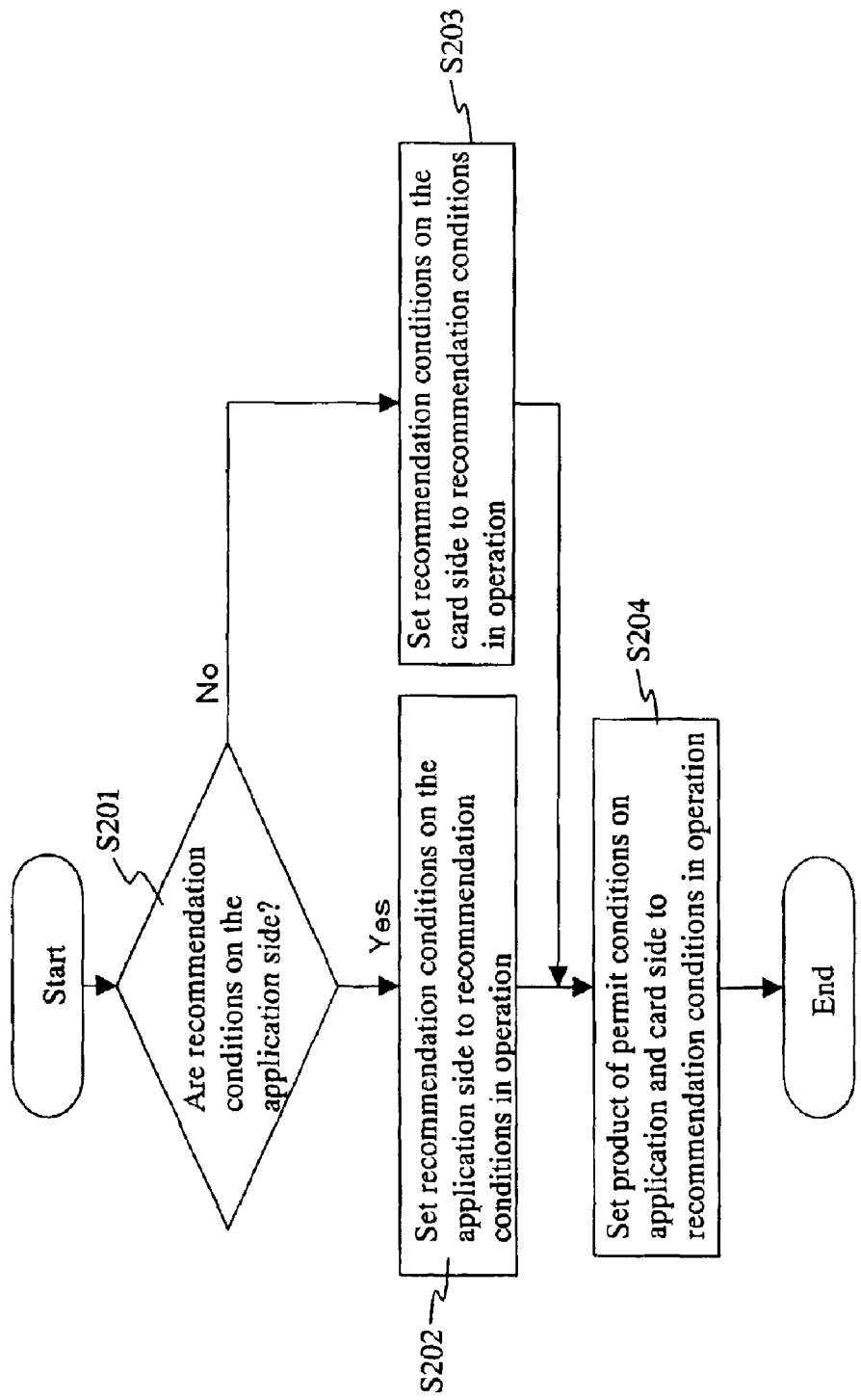
FIG. 8 is a flow chart showing a concrete procedure for setting designation conditions.

A concrete procedure for generating total communication conditions of the communication conditions table in operation is shown in a flow chart in FIG. 8. That is, as shown in FIG. 8, according to the control program, the CPU 104 judges whether recommendation conditions are included in the total communication conditions on the application-wise communication conditions information (S 201).

In case the CPU 104 judges that the total communication conditions of application-wise communication conditions information include recommendation conditions, the CPU 104 sets the recommendation conditions of the total communication conditions of the application-wise communication conditions information on the recommendation conditions of the total communication conditions of the communication conditions table in operation (S 202).

On the other hand, in case it is judged that recommendation conditions are not included in total communication conditions of application-wise communication conditions information, the CPU 104 sets the recommendation conditions of the total communication conditions of the card communication conditions information on the recommendation conditions of the total communication conditions of the communication conditions table in operation (S 203).

After setting the recommendation conditions of the total communication conditions of the communication conditions table in operation, the CPU 104 sets permit conditions of the total communication conditions of the communication conditions table in operation (S 204). The permit conditions of the total communication conditions of the communication conditions table in operation are obtained from a logical product of the permit conditions of the total communication conditions of the card communication conditions information and the permit conditions of the total communication conditions of the application-wise communication conditions information.

After thus setting the total communication conditions of the communication conditions table in operation, the CPU 104 compares the communication data-wise communication conditions information of the card communication conditions information of the communication conditions table and the communication data-wise communication conditions information of the application-wise communication conditions information of the communication conditions table according to the control program (S 102). In the comparison, CPU 104 judges whether the two are identical or not (S 103). If it is judged that the two are not identical, the CPU 104 generates communication data-wise communication conditions information of the communication conditions table in operation from the two (S 104).

The procedure for generating communication data-wise communication conditions information of the communication conditions table in operation is the same as that for generating the total communication conditions of the communication conditions table in operation that has already been described. That is, first the CPU 104 judges according to the control program whether recommendation conditions are included in the communication data-wise communication conditions information of the application-wise communication conditions information.

If it is judged that the recommendation conditions are included in the communication data-wise communication conditions information of the application-wise communication conditions information, the CPU 104 sets the recommendation conditions of the communication data-wise communication conditions information of the application-wise communication conditions information on the recommendation conditions of the communication data-wise communication conditions information of the communication conditions table in operation. On the other hand, if recommendation conditions are not included in communication data-wise communication conditions information of application-wise communication conditions information, the CPU 104 sets the recommendation conditions of the communication data-wise communication conditions information of the card communication conditions information on the recommendation conditions of the communication data-wise communication conditions information of the communication conditions table in operation.

After setting the recommendation conditions of communication data-wise communication conditions information of the communication conditions table in operation, the CPU 104 sets permit conditions of the communication data-wise communication conditions information of the communication conditions table in operation. The permit conditions of the communication data-wise communication conditions information of the communication conditions table is obtained form a logical product of the permit conditions of the communication data-wise communication conditions information of the card communication conditions information and the permit conditions of the communication data-wise communication conditions information of the application-wise communication conditions information.

The communication data-wise communication conditions information thus set is registered (S 105). According the control program, the CPU 104 judges whether all communication data-wise communication conditions information go through Steps S 102 to S 105 (S 106). If it is judged that all communication data-wise communication conditions information has not gone through Steps S 102 to S 105, the CPU 104 repeats the procedure from Step S 102 to S 105 for next communication data-wise communication conditions information. On the other hand, if it is judged that all communication data-wise communication conditions information has gone through the procedure from Step S102 to S105, generation of the communication conditions table in operation ends.

When the CPU 104 sends a response to a command from the external device 200 according to the application, for example, the CPU 104 refers to the conditions table or the above-mentioned communication conditions table in operation and decides on the communication interface 106 to switch. Here, the CPU 104 is to refer to the communication conditions table.

Figure 9:
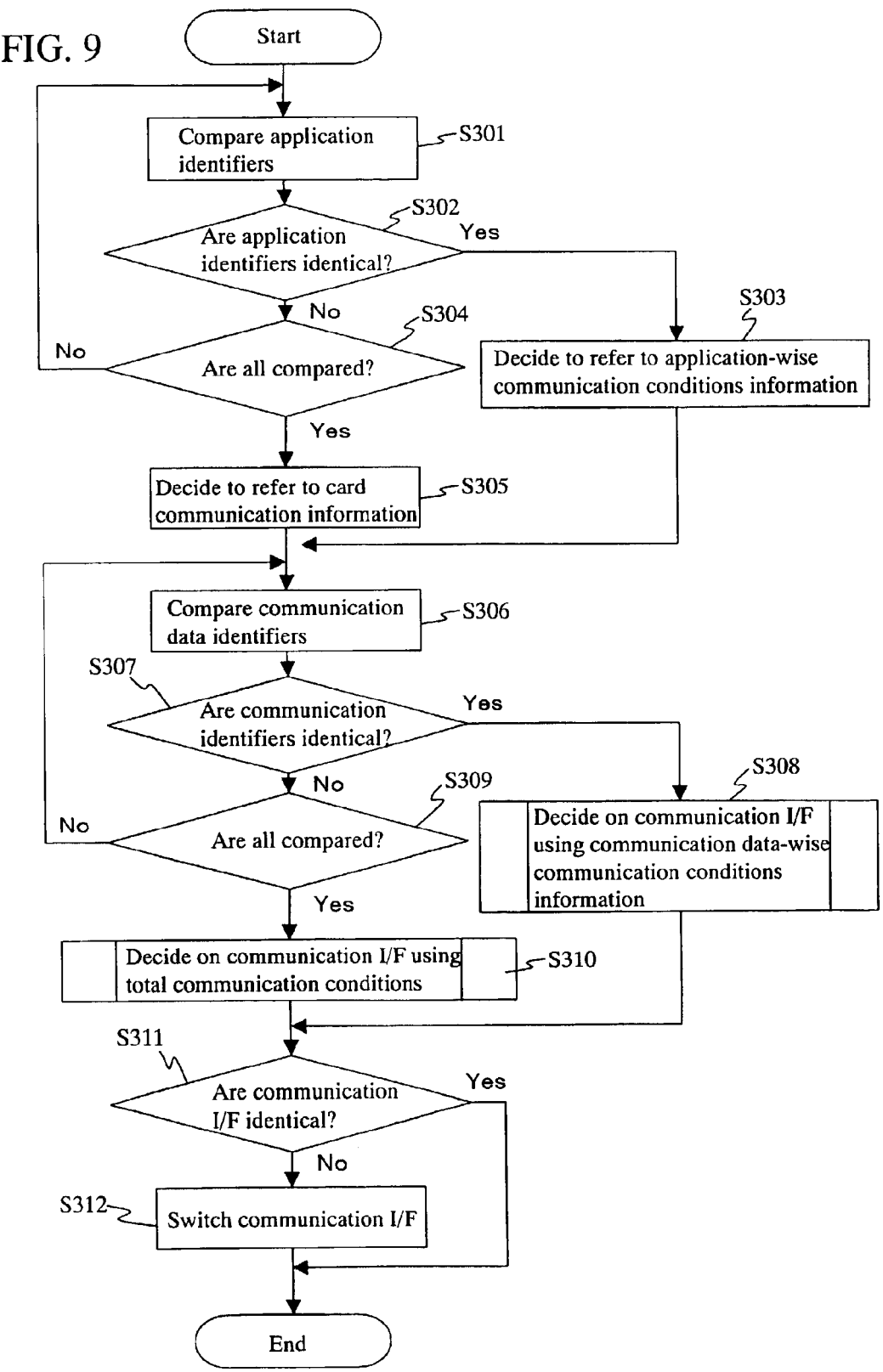
FIG. 9 is a flow chart showing a procedure for switching the communication interface.

As shown in FIG. 9, according to the control program, the CPU 104 first compares the application identifier of the started application and the application identifier included in the application-wise communication conditions information of the communication conditions table (S 301). In the comparison, the CPU 104 judges whether the two are identical or not (S 302). If it is judged that the two are identical, the CPU 104 decides to refer to the application-wise communication conditions information in the communication conditions tables in the procedure from Step S 306 afterward (S 303). On the other hand, if the two are not identical, the CPU 104 judges whether application identifiers are compared with regard to all application-wise communication conditions information of the communication conditions table (S 304). If it is judged that the application identifiers are compared with regard to all application-wise communication conditions information of the communication conditions table, the CPU 104 repeats Step S301, S302 with regard to next application-wise communication conditions information. On the other hand, if it is judged that application identifiers are compared with regard to all application-wise communication conditions information of the communication conditions table, the CPU 104 decides to refer to card communication information in the communication conditions table in the procedure from Step S 306 afterward (S 305).

Here, let it be supposed that the application is an application for a cash card and the application-wise communication conditions information of the application for the cash card is included in the communication conditions table.

Then, according to the control program, the CPU 104 compares the communication identifier of communication data to send in response and the communication identifier of communication data-wise communication conditions information of the application-wise communication conditions information to which the CPU 104 decides to refer (S 306). In the comparison, the CPU 104 judges whether the two are identical or not (S 307). In case the two are identical, according to the control program, the CPU 104 decides on the communication interface 106 using the communication data-wise communication conditions information of which communication data-wise identifiers are identical (S 308).

Figure 10:
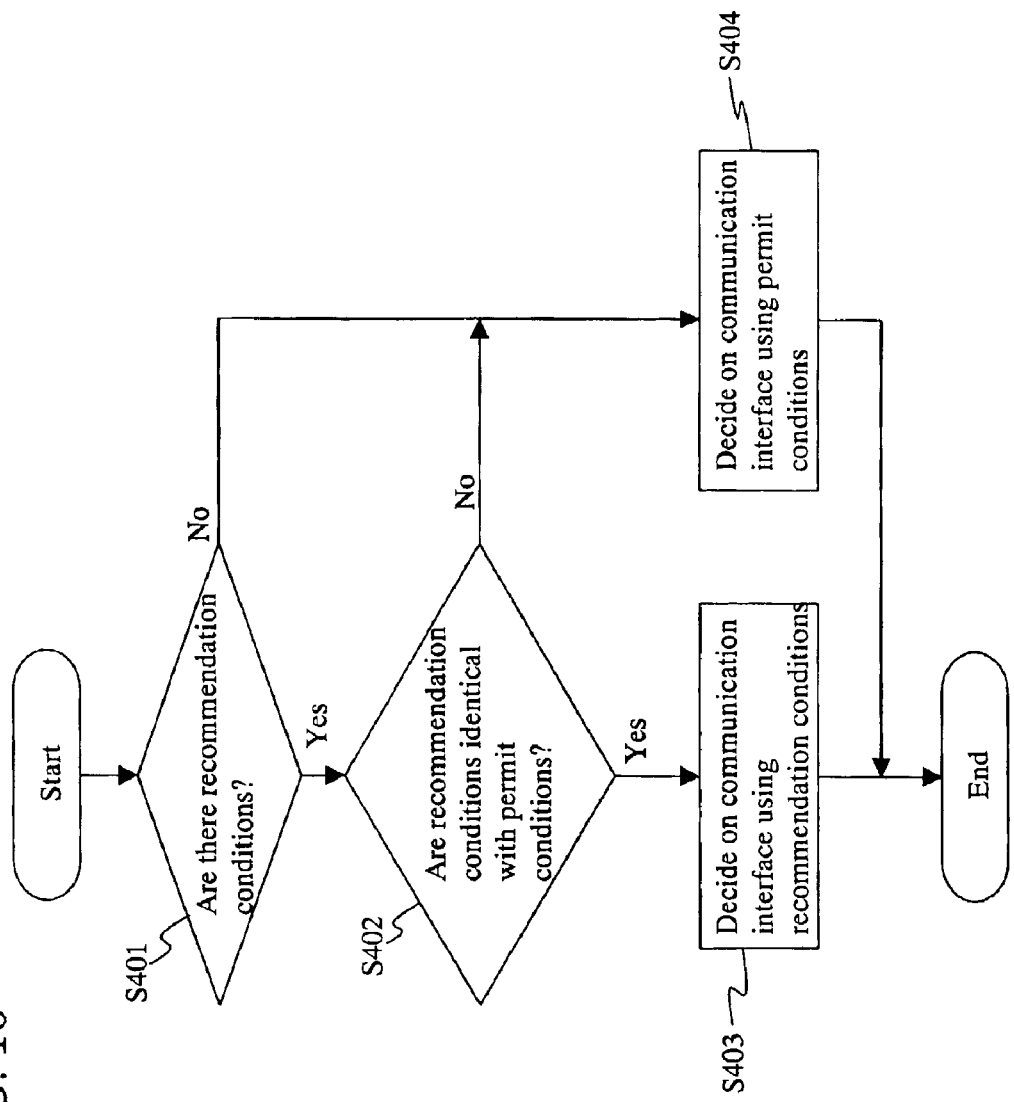
FIG. 10 is a flow chart showing a concrete procedure for deciding on the communication interface.

A concrete procedure for deciding on communication interface 106 using the communication data-wise communication conditions information is shown in FIG. 10.

As shown in FIG. 10, according to the control program, the CPU 104 first judges whether recommendation conditions are included in the designation information of the communication data-wise communication conditions information (S 401). In case it is judged that the recommendation conditions are included, the CPU 104 judges whether the recommendation conditions are identical with the permit conditions (S 402). If it is judged that the recommendation conditions are identical with the permit conditions, the CPU 104 decides on the communication interface 106 according to the recommendation conditions (S 403). On the other hand, in case it is judged in Step 401 that the recommendation conditions are not included or in case it is judged in Step 402 that the recommendation conditions do not agree with the permit conditions, the CPU 104 decides on the communication interface 106 according to permit conditions (S 404).

Here, let it be supposed that communication data to be identified by the communication source identifier is a code number set in the bank account corresponding to the cash card. This communication source identifier is included in the communication data-wise communication conditions information having the designation conditions as shown in FIG. 11.

As shown in FIG. 11, the designation conditions include both the permit conditions and the recommendation conditions. Both of them designate contact-type interface 106*a*. In this case, the contact-type interface 106*a* is decided on as the communication interface 106 in the step S308 as mentioned above.

In the step S 307, on the other hand, if it is judged that the communication data identifiers are not identical, the CPU 104 judges whether a comparison has been made of communication data identifiers of all communication data-wise communication conditions information included in the application-wise communication conditions information (S 309). If it is judged that a comparison has been made of communication data identifiers of all communication data-wise communication conditions information, the CPU 104 decides on the communication interface 106 using the total communication conditions according to the control program (S 310).

The concrete procedure for deciding on the communication interface 106 using the total communication conditions is the same as that for deciding on the communication interface 106 using the communication data-wise communication conditions information.

That is, the CPU 104 first judges according to the control program whether recommendation conditions are included in the total communication conditions. In case it is judged that the recommendation conditions are included, the CPU 104 judges whether the recommendation conditions agree with the permit conditions. In case it is judged that the recommendation conditions agree with the permit conditions, the CPU 104 decides on the communication interface 106 according to the recommendation conditions. On the other hand, if it is judged that recommendation conditions are not included or in case the recommendation conditions do not agree with the permit conditions, the CPU 104 decides on the communication interface 106 according to the permit conditions.

After deciding on the communication interface 106 that follows the communication conditions table, then the CPU 104 judges whether the communication interface 106 decided on is identical with the communication interface 106 connected the CPU 104 through the changeover switch 105 (S 311).

If it is judged that the communication interfaces 106 are not identical, the CPU 104 sends out a changeover request to the changeover switch 105, so that the changeover switch 105 switches the communication interface 106 with the external device 200 (S 312). In this case, receiving the changeover request from the CPU 104, the changeover switch 105 switches the communication interface 106 for communication with the external device to the contact-type interface 106*a*.

On the other hand, if it is judged that the communication interfaces 106 are identical, the CPU 104 does not send out a changeover request to changeover switch 105, but finishes the processing to set the communication interface 106 used for communication with the external device 200.

In this IC card 100, in case communication data is a highly confidential code number of the cash card, for example, the communication interface 106 used for its communication is set to the contact-type interface 106*a* which is highly safe in the light of security.

Then, when the sending of the code number is finished and other communication data is sent from the IC card 100 to the external device 200, the communication interface 106 that follows the communication conditions for the communication data is decided. If the decided communication interface 106 that follows communication conditions table for the communication data is the non-contact-type interface, the communication interface 106 used for communication with the external device 200 is switched from the contact-type interface 106*a* to the non-contact-type interface 106*b*. In this case, even if the volume of the communication data is large, for example, the sending can be finished in a short time at a high speed of the non-contact-type interface 106*b*.

Figure 12:
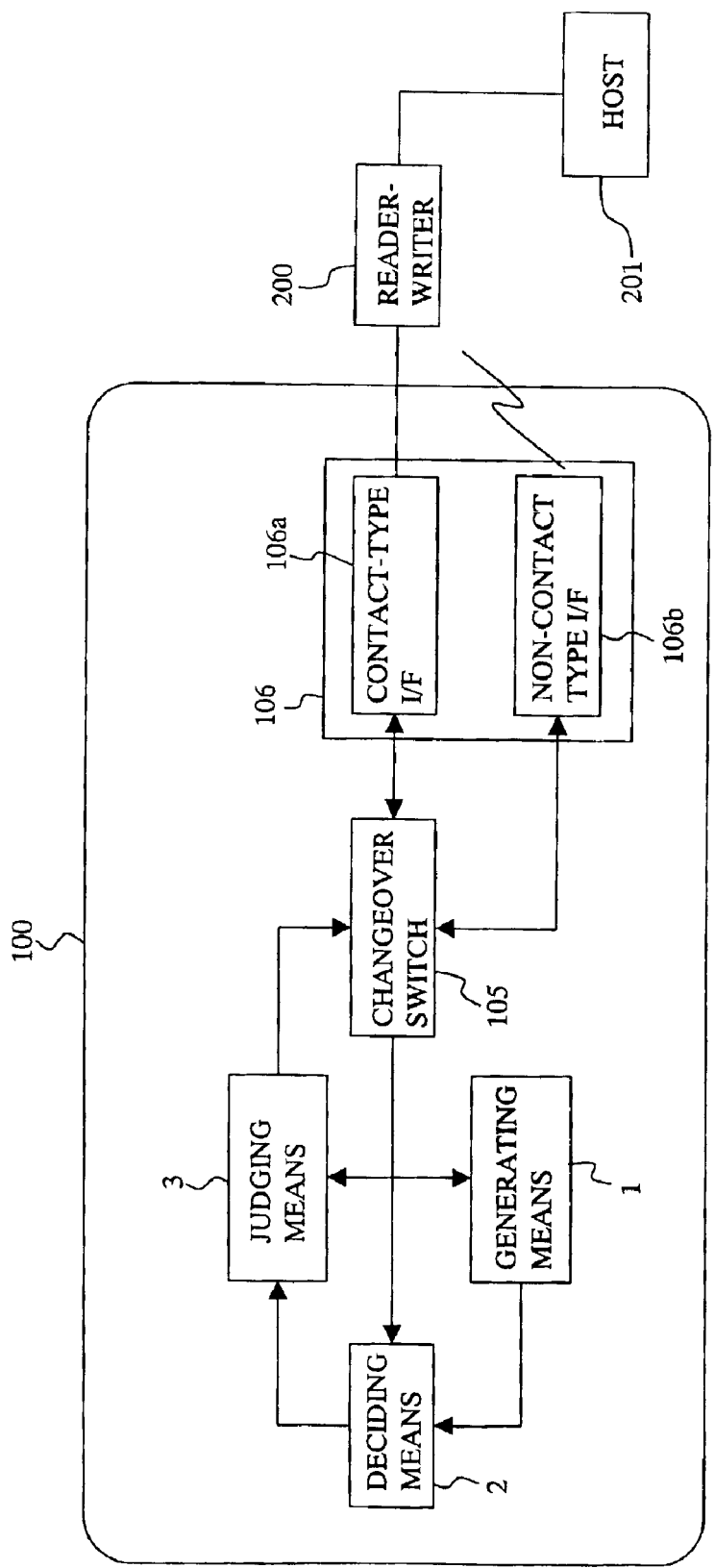
FIG. 12 is a diagram showing a basic arrangement of an IC card to which the present invention is applied.

If the CPU 104 operates as above according to the control program, generating means 1, deciding means 2, and judging means 3 shown in FIG. 12 are accomplished. The generating means 1 is a means for generating a communication conditions table in operation and does processing for the procedures shown in FIG. 7 and FIG. 8. The deciding means 2 is a means for deciding on communication interface that follows the communication conditions in operation, and does processing for the procedure from Step S 301 to Step S 309. The judging means 3 is a means for deciding on the basis of a decision of deciding means 2 whether or not to switch the communication interface 106 communication interface 106 used for communication with the external device 200 between the contact-type interface 106*a* and the non-contact-type interface 106*b*, and does processing for Step S 311 shown in FIG. 9. If the judging means 3 decides to switch communication interface used for communication the with external device 200, the changeover switch 105 switches the communication interface 106 used for communication with the external device 200. Those means 1, 2 and 3 are accomplished not only with software but also with special hardware.

Embodiment 2

As already has been mentioned, in case importance is attached to the security of communication data that the IC card 100 communicates with external device 200, communication interface 106 used for communication with the external device 200 is preferably the contact-type interface 106*a* rather than the non-contact-type interface 106*b*.

In this case, if communication data is data to be classified, conditions concerning communication data communicated with the external device 200 will be conditions for designating the non-contact-type interface 106b as the communication interface 106 used for communication with the external device 200.

The data to be classified is data including at least one of an encryption key, a signature, random number, a certificate and encrypted data. Here, the random numbers are used as challenge data for authentication. If these data leak out, the possibility will be high that the cryptograph will be decoded and thus the safety in the light of security will lower.

Meanwhile, the communication data to be classified is communicated between the IC card 100 and the external device 200 in sending commands from the external device 200 to the IC card 100 or sending in response from the IC card 100 to the external device 200.

Among the commands that the IC card 100 receives from the external device 200 are various commands such as SELECT FILE command to select a current file and GET CHALLENGE command requesting the output of challenge as disclosed in the IC card specification V2.0 of JICSAP (Japan IC Card System Application Council).

Therefore, conditions concerning communication data designate a communication interface used for communication with the external device for every command communicated with the external device 200, for example.

Now, an example of relations between command sets and conditions concerning communication data is shown in FIG. 13.

In the example in FIG. 13, conditions concerning communication data are stipulated for every command with regard to the case where the IC card 100 receives commands from the external device 200 and the case where the IC card 100 sends responses to commands received from the external device 200.

Circle marks in the command receiving and response sending columns in FIG. 13 indicate that the use of contact-type interface 106a or non-contact-type interface 106b is permitted. X marks show that the use of non-contact-type interface 106b is prohibited. That is, x marks indicate that conditions concerning communication data designate the contact-type interface 106a as the communication interface.

The reason why the conditions concerning communication data are stipulated not only for every command but also for command receiving of each command and response sending to each command is that there are cases where for even one command, communication data involved therein is data to be classified and data not to be classified.

For the GET CHALLENGE command, for example, the external device 200 sends a command to the IC card 100, but the command message does not include data to be classified. On the other hand, the response data that the IC card 100 sends to the external device 200 includes a random number requested as challenge data. This random number is encrypted using the external authentication key of the IC card 100 stored on the side of the external device 200. The encrypted random number is sent to the IC card 100 from the external device 200 as the external authentication code. The IC card 100 restores the random number from this external authentication code, and judges whether the restored random number is identical with that sent to the external device 200 earlier. By this judgement, the external device 200 is authenticated, and therefore if the random number to be sent from the IC card 100 to the external device 200 leaks out, there is fear that an illegal authentication may be done. Therefore, when receiving the GET CHALLENGE command, the command is permitted to use of the contact-type interface 106a or the non-contact-type interface 106b, but when sending a response to this command, the use of the contact-type interface 106a alone is permitted.

In this Embodiment 2, the CPU 104 of the IC card 100 shown in FIG. 1 decides on a communication interface that follows conditions concerning communication data in FIG. 13. The CPU 104 identifies a command from the external device 200 and decides on a communication interface of which use is permitted by conditions concerning communication data for the command.

The CPU 104 compares the decided communication interface and the communication interface now in use, for example. If the two are different, the CPU 104 judges whether to switch the communication interface.

Figure 14:
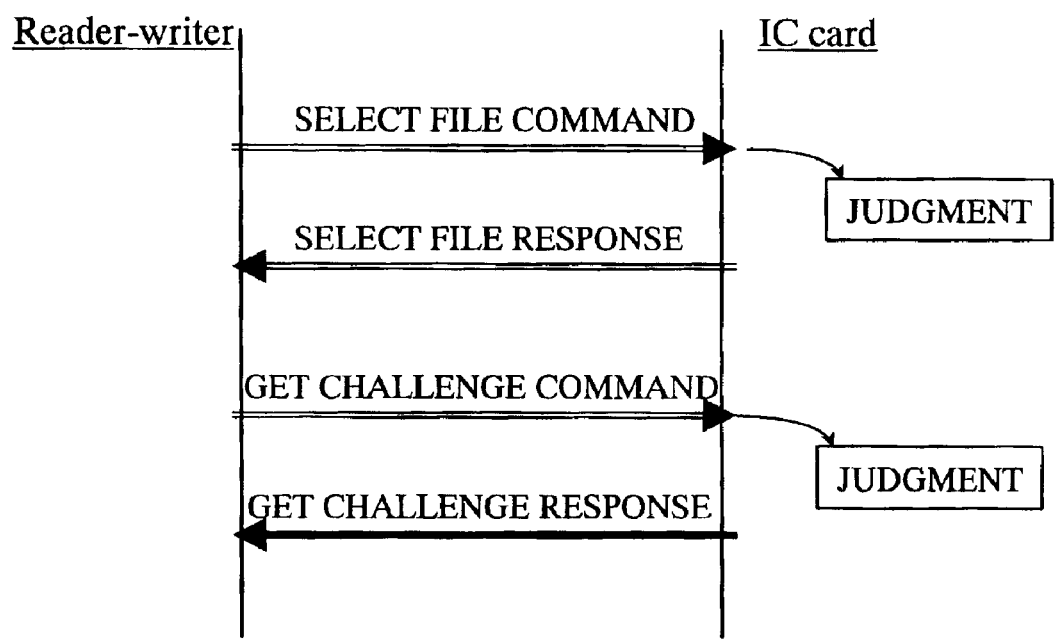
FIG. 14 is a diagram showing an example of commands the IC card receives from the external device.

Now, let it be assumed that the SELECT FILE command and GET CHALLENGE command are sent from the external device 200 to the IC card 100 one after another as shown in FIG. 14.

When the IC card 100 receives the SELECT FILE command, the CPU 104 identifies it, and refers to conditions concerning communication data in FIG. 13 and to permit both the contact-type interface 106a and the non-contact-type interface 106b as the communication interface 106.

In this case, even if it is the contact-type interface 106a or the non-contact-type interface 106b that the IC card 100 has used as the communication interface 106 for communication with the external device 200, the CPU 104 does not judge whether to switch communication interface 106.

If the communication interface 106 that has been used is the non-contact-type interface 106b, selection results of the current file are sent from the IC card 100 to the external device 200 as response data using the non-contact-type interface 106b.

Next, if the IC card 100 receives the GET CHALLENGE command, the CPU 104 identifies its command and decides on the contact-type interface 106a permitted by conditions concerning communication data for the identified command as the communication interface 106.

On the basis of this decision, the CPU 104 judges whether to switch communication interface 106 to be used for communication with the external device 200. In this case, the decided communication interface 106 is the contact-type interface 106a while the communication interface 106 that has been used is the non-contact-type interface 106b. Since the two are different, the CPU 104 decides to switch the communication interface 106.

In accordance with this decision, the CPU 104 controls the changeover switch 105, and the changeover switch 105 switches the communication interface 106 used for communication with the external device 200 from the non-contact-type interface 106b to the contact-type interface 106a.

Therefore, the random number of the response data of the GET CHALLENGE command is sent to from the IC card 100 to the external device 200 using the contact-type interface 106a.

That reduces danger that the random number as challenge data will leak out.

Thus, in case communication data is data to be classified, when conditions concerning the communication data designate the contact-type interface as the communication interface, it is possible to improve safety in the light of security.

Furthermore, as in the above-mentioned example, in case changeover judgement is made each time command is received, control in accordance with the command can be exercised. Each time command is received, changeover judgement does not always have to be made. For example, it may be so arranged that during authentication changeover judgement is made for each command and after authentication is over, the communication interface 106 used by the IC card 100 for communication with the external device 200 is fixed.

Embodiment 3

In the Embodiment 1, either the contact-type interface 106a or the non-contact-type interface 106b is used for communication with the external device 200. It is possible to use the contact-type interface 106a and non-contact-type interface 106b at the same time. For example, different communication interfaces 106 are used for sending and receiving.

Figure 15:
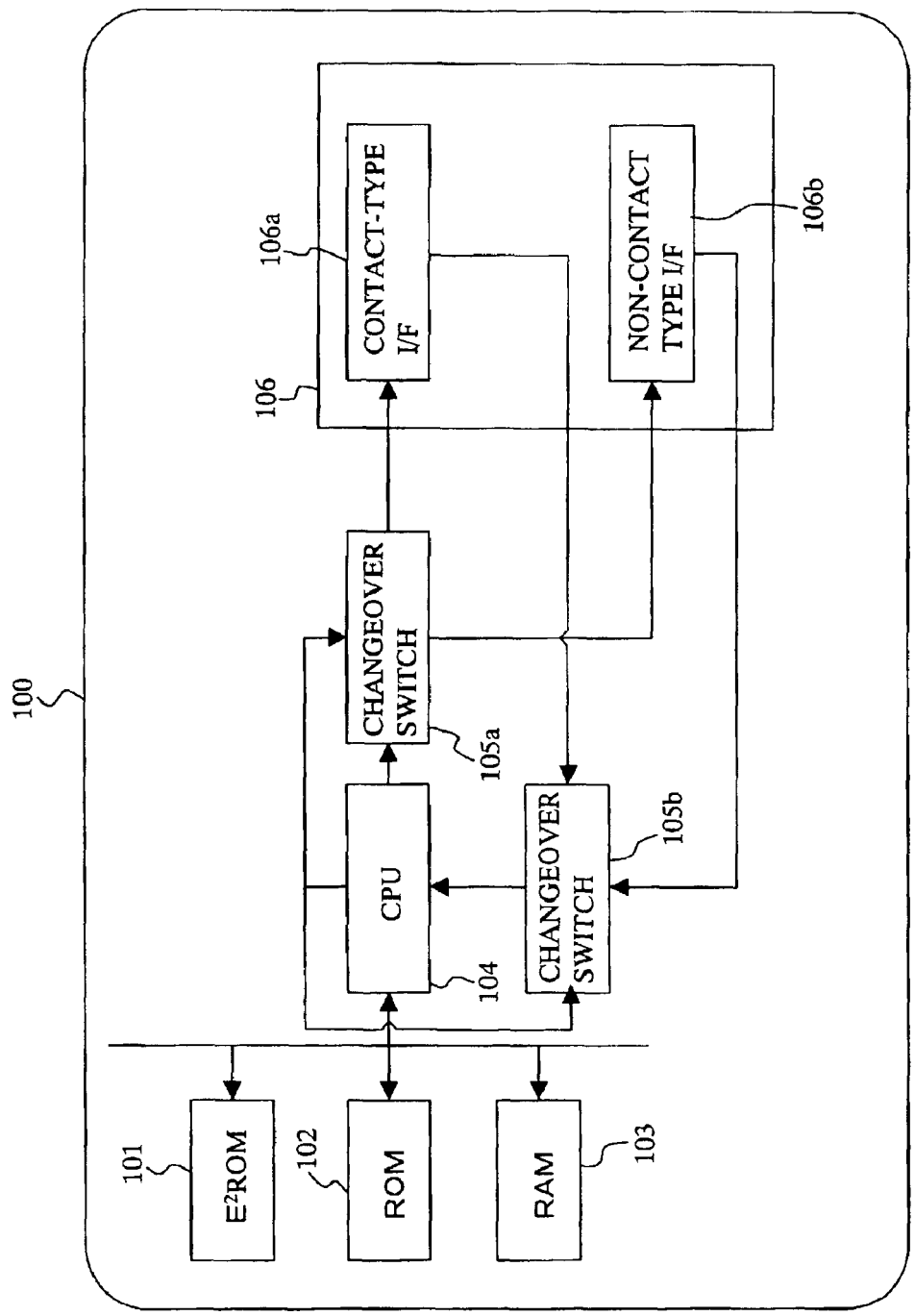
FIG. 15 is a diagram showing a rough arrangement of an IC card in Embodiment 3.

FIG. 15 is a configuration example of an IC card that uses communication interface 106 for sending and receiving.

In this IC card, as shown in FIG. 15, a changeover switch 105a and a changeover switch 105b are connected to the output side of sending data and the input side of receiving data of a CPU 104 respectively. The changeover switches 105a and 105b switch communication interface 106 connected to the CPU 104 between a contact-type interface 106a and a communication interface 106b.

As in the Embodiment 1, for example, the CPU 104 decides on a communication interface 106 that follows conditions concerning communication with an external device 200 and judges whether to switch the changeover switch 105a and the changeover switch 105b.

In case, following this judgement, the changeover switch 105a or the changeover switch 105b switches the communication interface 106 connected to the CPU 104 to one of the contact-type interface 106a and the non-contact-type interface 106b, the CPU 104 makes the changeover switch 105b or the changeover switch 105a switch the communication interface 106 connected to the CPU 104 to the other of the contact-type interface 106a and the non-contact-type interface 106b.

For example, if permit conditions of the communication conditions table permit both the contact-type interface 106a and the on-contact-type interface 106b, different communication interfaces may be used on the sending side and the receiving side. That can accomplish full duplex communication in a pseudo manner. In this case, if the volume of receiving data is larger than the volume of sending data, the changeover switch 105a sets the communication interface 106 to the contact-type interface 106a, while the changeover switch 105bsets the communication interface 106 to the non-contact-type interface 106b. Through such setting, full duplex communication can be effected more smoothly.

Two communication conditions tables may be provided separately, one for sending and the other for receiving. According to the control program, the CPU 104 refers to the communication conditions table for sending and the communication conditions table for receiving, and decides on the communication interface 106 on the sending side and the communication interface 106 on the receiving side.

Embodiment 4

In the Embodiment 1 described earlier, the communication interface 106 used for communication with the external device 200 is switched according to communication data. The present invention is not limited to that.

For example, the IC card may set the communication interface 106 to use for communication with the external device 200 by the communication interface that the external device 200 has.

But some external devices 200 are provided with the contact-type interface only and others have the non-contact-type interface only. Even if the communication interface 106 used for communication with the external device 200 is set to the contact-type interface, communication cannot be effected if the external device 200 is provided with the non-contact-type interface only.

Therefore, if it is found that the external device 200 is provided with the non-contact-type interface only, the CPU 104 judges whether the specified communication interface of the external device 200 is identical with the communication interface 106 now set. If it is judged the two are not identical, the CPU 104 makes the changeover switch 105 switch the communication interface 106 to the non-contact-type interface 106b.

Whether the external device 200 is provided with the non-contact-type interface only can be found by signals from either of the types of the communication interface 106 or applied power.

Figure 16:
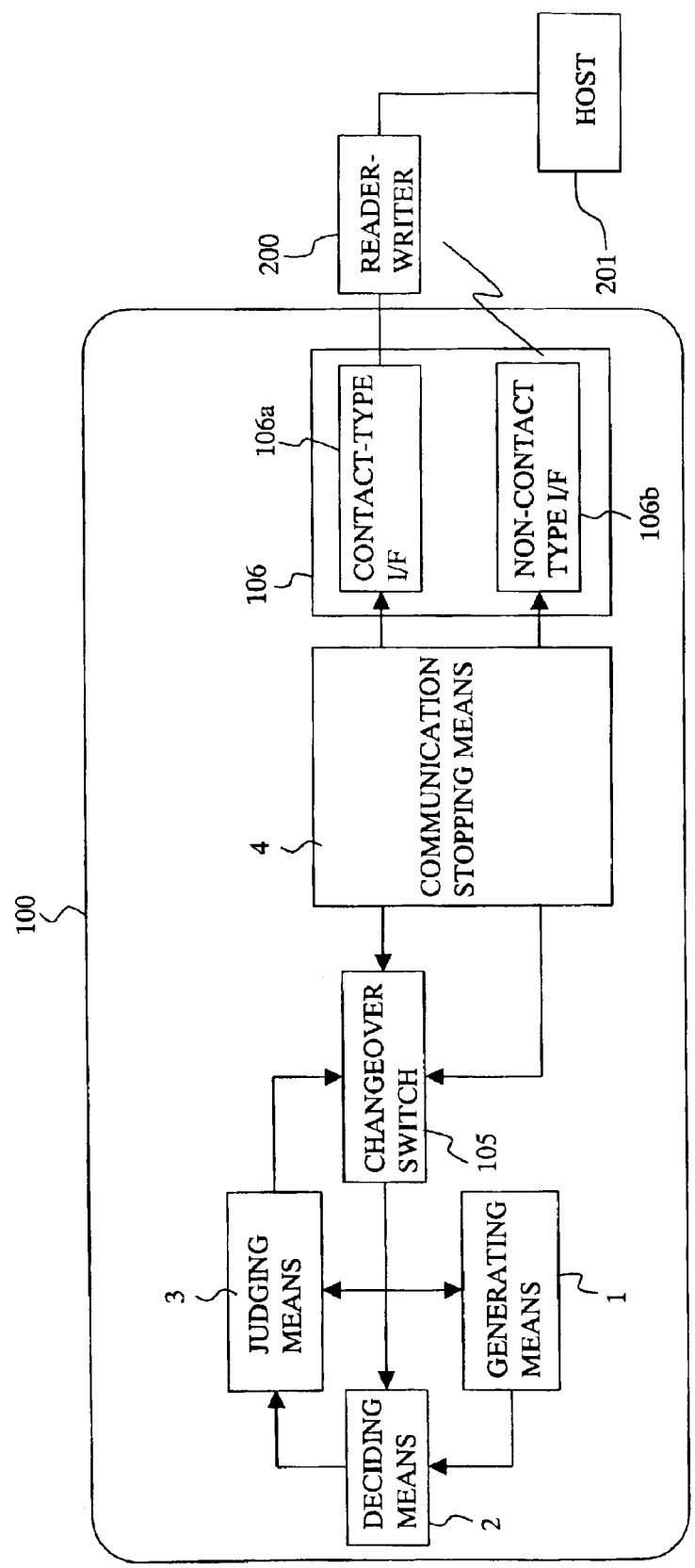
FIG. 16 is a functional block diaphragm of an IC card in Embodiment 4.

In this case, if communication data is highly confidential data, it is desirable that the communication data will not be communicated through the non-contact-type interface 106b to which the communication interface 106 is switched in accordance with the external device 200. If the control program makes the CPU 104 exercise control for that, not only generating means 1, deciding means 2 and judging means 3 but also communication stopping means 4 can be accomplished as shown in FIG. 16.

In case there are a plurality of communication conditions including the conditions concerning communication data for communication with the external device 200, when the communication interface decided according to other communication conditions than the conditions concerning communication data is the non-contact type interface 106b, if the permit conditions of the conditions concerning communication data prohibit use of the non-contact-type interface, the communication stopping means 4 will stop communication utilizing the non-contact-type interface of communication data.

In this example, after deciding on the communication interface according to the communication conditions concerning communication interface that the external device 200 has, the CPU 104 refers to the corresponding permit conditions in the communication conditions table concerning communication data.

In case the permit conditions for the communication data prohibit use of the non-contact-type interface, the CPU 104 stops communication of communication data using the non-contact-type interface 106binstead of switching the communication interface 106. Then, instead of the communication data, a message may be sent informing that communication cannot be conducted for security reasons.

Hereby, though communication interface 106 used for communication with external device 200 is set to contact-type interface 106a, the IC card can communicate and the safety in the light of security can be secured, even if external device 200 is provided with a non-contact-type interface only.

Also, though the communication interface 106 used for communication with the external device 200 is set to the non-contact-type interface 106b, the IC card can communicate with the external device using contact-type interface 106a in the same way as described above, even if external device 200 is provided with a contact-type interface only.

Furthermore, in case the external device 200 is provided with the contact-type interface and the non-contact-type interface as the communication interface and if an arrangement is so made that the communication interface used for communication is switched in a given time-series pattern, that permits the IC card and the external device to authenticate each other's validity or merely confirm the communication partner. Even if the communication interface is switched in a given time-series pattern and if communication between the IC card and the external device is successful, what the two parties know its pattern infers that each is properly authenticated by the other or that communication partners are appropriately confirmed. This processing is done by the CPU 104 in accordance with the conditions that the two parties authenticate each other and confirm the communication partner. In this case, the more complicated the given pattern is, the more secure the authentication and confirmation become.

In the respective embodiments described, the present invention is applied to the IC card. The present invention is not limited to that but can be applied to other electronic devices provided with a contact-type interface and a non-contact-type interface as the communication interface. For example, the present invention can be applied to a portable information terminal provided with a non-contact-type interface using a portable telephone and a contact-type interface utilizing a cable.

In Embodiment 1 described earlier, only one CPU 104 is mounted on the IC card 100. A plurality of CPU's 104 may be mounted on the IC card 100. In this case, processing can be shared. For example, one CPU 104 decides on the communication interface on the sending side and another CPU 104 decides on the communication interface on the receiving side.

If the transaction amount were small and if the transaction itself should be one to be classified, the loss will be small. Therefore, the communication interface may set to the contact-type interface, for example, in accordance with communication conditions concerning the contents of communication data such as transaction amount.

In the credit card or the like, in case the host 201 has not authenticated the IC card 100 but only the external device 200 has authenticated, the floor limit will be limited to a small amount. If, therefore, the host 201 has authenticated the IC card 100 according to conditions concerning the authentication entity, communication interface 106 to be used for communication with the external device 200 will be set to the contact-type interface 106a. If only the external device 200 has authenticated the IC card 100, communication interface 106 to be used for communication with the external device 200 may be set to the non-contact-type interface 106b.

As set forth above, it is judged whether the communication interface used for communication with the external device is switched to the contact-type interface or the non-contact-type interface on the basis of the decision of the communication interface that follows communication conditions concerning communication with the external device. Therefore, advantages of the respective interface types can be made good use of as improvement of safety in the light of security, speedup of communication speed.

For example, communication conditions are conditions concerning communication data and in case the communication data is data to be classified, and if the conditions concerning communication data designate communication interface used for communication with the external device as the contact-type interface, there becomes to be less the possibility that data to be classified is tapped.

If conditions concerning communication data designate a communication interface used for communication with the external device for every command to be communicated with the external device, the communication interface can be switched in accordance with the command, whether the command is accompanied by communication of data to be classified or not.

Though the communication interface decided according to communication conditions other than the conditions concerning communication data is the non-contact-type interface, if the permit conditions of the conditions concerning communication data prohibit use of the non-contact-type interface, by stopping communicating communication data using the non-contact-type interface, it is possible to avoid communicating highly confidential communication data using the non-contact-type interface that has a high possibility of tapping even if the communication interface is fixed to the non-contact-type interface, for example.

The contact-type interface and the non-contact-type interface both can be made good use of as making full duplex communication possible in pseudo manner by deciding on different communication interfaces for data to be sent to the external device and data to be communicated from the electronic device and by making a judgement on whether to switch the communication interface and switching the communication interface on the basis of that decision.

What is claimed is:

1. An electronic device having a contact-type interface and a non-contact-type interface as a communication interface for communication with an external device, said electronic device comprising:

a deciding unit operable to decide on a communication interface that follows communication conditions concerning communication with the external device, said communication conditions including conditions concerning communication data communicated with the external device, said conditions concerning communication data designating the communication interface used for communication with the external device said contact-type interface in case said communication data is data to be classified and designating a communication interface to be used for communication with the external device for every command communicated with the external device, a judging unit operable to judge whether to switch the communication interface between the contact-type interface and the non-contact-type interface on the basis of the decision of said deciding unit, and a switching unit operable to switch the communication interface used for communication with the external device in case said judging unit judges that the communication interface used for communication with the external device should be switched, and wherein said conditions concerning communication data are stipulated for every command with regard to the case of receiving the command from the external device and the case of sending the response.

2. The electronic device according to claim 1, wherein said data to be classified includes at least any one of an encryption key, a signature, random numbers, a certificate and encrypted data.

3. The electronic device according to claim 1, wherein said communication conditions include permit conditions stipulating permission and prohibition of use of the communication interface and recommendation conditions which are used unless said recommendation conditions contradict the permit conditions, and wherein said deciding unit judges whether the permit conditions and the recommendation conditions agree with each other, and decides on a communication interface using the recommendation conditions if said permit conditions agree with each other, and decides on a communication interface using the permit conditions if said permit conditions and said recommendation conditions do not agree with each other.

4. The electronic device according to claim 3 which further comprises a communication stopping unit, in case there are a plurality of communication conditions including the conditions concerning communication data communicated with the external device, when the communication interface that said deciding unit decides on in accordance with the communication conditions other than the conditions concerning communication data is the non-contact-type interface, if the permit conditions of the conditions concerning communication data prohibit use of the non-contact-type interface, for stopping communication using the non-contact-type interface of communication data for which the use of the non-contact-type interface is prohibited.

5. The electronic device according to claim 1, wherein said deciding unit changes a communication interface to decide on in a given time-series pattern.

6. The electronic device according to claim 1, wherein said deciding unit decides on different communication interfaces for data to be sent to the external device and for data to be received from the external device.

7. The electronic device according to claim 6 which has the switching unit on both sides to send data to the external device and to receive data from the external device, and
wherein if the switching unit on one of the side to send data to the external device and the side to receive data from the external device switches the communication interface to one of the contact-type interface and the non-contact-type interface, the switching unit on the other of the side switches the communication interface to the other of the interfaces.

8. An IC card having a contact-type interface and a non-contact-type interface as a communication interface for communication with an external device, said IC card comprising:
a deciding unit operable to decide on a communication interface that follows communication conditions concerning communication with the external device, said communication conditions including conditions concerning communication data communicated with the external device, said conditions concerning communication data designating the communication interface used for communication with the external device said contact-type interface in case said communication data is data to be classified and designating a communication interface to be used for communication with the external device for every command communicated with the external device,
a judging unit operable to judge whether to switch the communication interface between the contact-type interface and the non-contact-type interface on the basis of the decision of said deciding unit, and
a switching unit operable to switch the communication interface used for communication with the external device in case said judging unit judges that the communication interface used for communication with the external device should be switched, wherein said communication conditions include permit conditions stipulating permission and prohibition of use of the communication interface and recommendation conditions which are used unless said recommendation conditions contradict the permit conditions, and
wherein said deciding unit judges whether the permit conditions and the recommendation conditions agree with each other, and decides on a communication interface using the recommendation conditions if said permit conditions agree with each other, and decides on a communication interface using the permit conditions if said permit conditions do not agree with each other.

9. An IC card having a contact-type interface and a non-contact-type interface as a communication interface for communication with an external device, said IC card comprising:
a deciding unit operable to decide on a communication interface that follows communication conditions concerning communication with the external device, said communication conditions including conditions concerning communication data communicated with the external device, said conditions concerning communication data designating the communication interface used for communication with the external device said contact-type interface in case said communication data is data to be classified and designating a communication interface to be used for communication with the external device for every command communicated with the external device,
a judging unit operable to judge whether to switch the communication interface between the contact-type interface and the non-contact-type interface on the basis of the decision of said deciding unit, and
a switching unit operable to switch the communication interface used for communication with the external device in case said judging unit judges that the communication interface used for communication with the external device should be switched, and
a communication stopping unit, in case there are a plurality of communication conditions including the conditions concerning communication data communicated with the external device, when the communication interface that said deciding unit decides on in accordance with the communication conditions other than the conditions concerning communication data is the non-contact-type interface, if the permit conditions of the conditions concerning communication data prohibit use of the non-contact-type interface, for stopping communication using the non-contact-type interface of communication data for which the use of the non-contact-type interface is prohibited.

10. An IC card having a contact-type interface and a non-contact-type interface as a communication interface for communication with an external device, said IC card comprising:
a deciding unit operable to decide on a communication interface that follows communication conditions concerning communication with the external device, said communication conditions including conditions concerning communication data communicated with the external device, said conditions concerning communication data designating the communication interface used for communication with the external device said contact-type interface in case said communication data is data to be classified and designating a communication interface to be used for communication with the external device for every command communicated with the external device,
a judging unit operable to judge whether to switch the communication interface between the contact-type interface and the non-contact-type interface on the basis of the decision of said deciding unit, and a switching unit operable to switch the communication interface used for communication with the external device in case said judging unit judges that the communication interface used for communication with the external device should be switched, and wherein said conditions concerning communication data are stipulated for every command with regard to the case of receiving the command from the external device and the case of sending the response.

* * * * *